(No Model.)

G. H. MATTHEWS & J. T. OSTELL.
FISHING REEL.

No. 264,092. Patented Sept. 12, 1882.

Witnesses:
Owen N. Evans
Alec. Brault

George Hillyard Matthews
John Thomas Ostell
Inventors

Per Atty:

UNITED STATES PATENT OFFICE.

GEORGE H. MATTHEWS AND JOHN T. OSTELL, OF MONTREAL, QUEBEC, CANADA.

FISHING-REEL.

SPECIFICATION forming part of Letters Patent No. 264,092, dated September 12, 1882.

Application filed September 10, 1881. (No model.)

*To all whom it may concern:*

Be it known that we, GEORGE HILLYARD MATTHEWS and JOHN THOMAS OSTELL, both of the city of Montreal, in the District of Montreal and Province of Quebec, Canada, have invented a certain new and useful Improved Fishing-Reel; and we do hereby declare that the following is a full, clear, and exact description of the same.

Upon the ordinary plate by which a reel is attached to the rod we propose to mount, instead of the usual solid side disks, two rings connected by radial arms with centers, in which is carried the spindle. Upon the spindle are secured rigidly two rings similarly constructed, and of somewhat less diameter than the fixed rings and revolving just inside them. These inner rings carry on their radial arms transverse bars, upon which the line is wound, set equidistant from the center. At opposite points in the fixed outer rings are placed transverse bars in pairs, the line passing between them.

Figure 1:
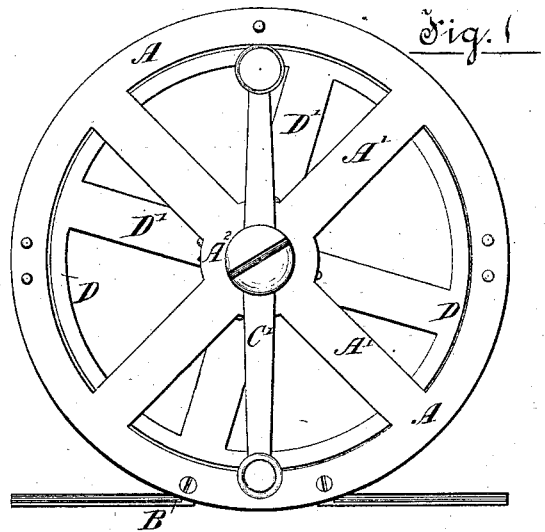
Figure 2:
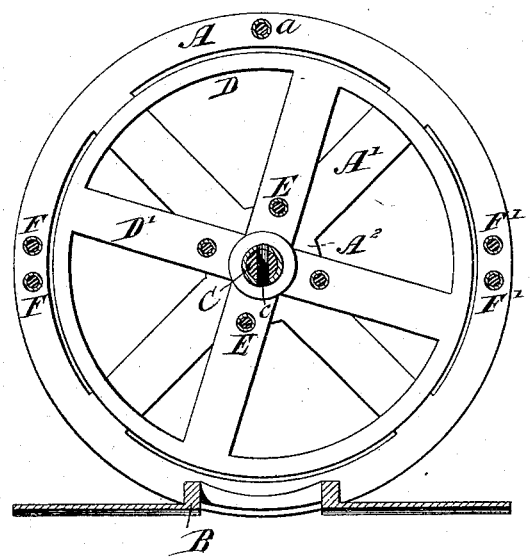

For full comprehension of our invention reference must be had to the annexed drawings, in which Figure 1 is a side view of the reel. Fig. 2 is a vertical sectional elevation, and Fig. 3 an end view of same.

Similar letters of reference indicate like parts.

A A are the outer rings, A' A' being their radial arms, and A² the central disks. These rings A A are secured to a plate, B, (preferably of the form shown and attached to the rod in any ordinary way,) and may be further connected by a stay or stays, *a*.

Figure 3:
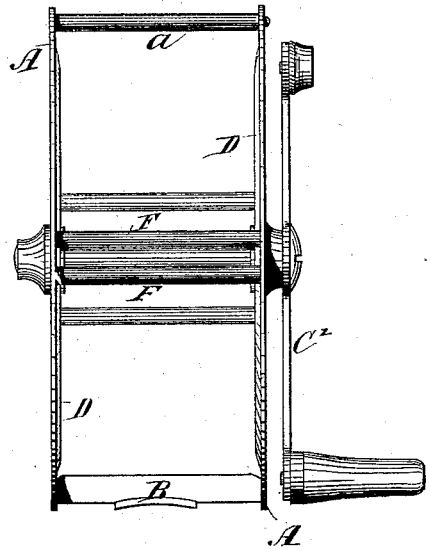

As shown in Fig. 3, bearings are formed in the centers A² for the spindle C, rotated, as usual, by a handle, C', (which may be provided with a balance or click,) and pierced, as at *c*, in the usual way, to enable the line to be attached thereto.

D D are the inner wheels or disks, made as shown, mounted on the spindle C and revolving therewith just inside and clear of the outer rings, A. In the arms D' D' are secured, at any point desired and equidistant from the center, transverse bars E E, upon which the line is wound.

F F F' F' are pairs of transverse bars secured preferably opposite to each other and a little below the center in the rings A A. The line in its passage to or from the reel passes between these.

The advantages secured by the construction and arrangement just described are as follows: the diminution in weight without any lessening of the strength of the apparatus. The fact that the line, by passing between the bars F F or F' F', even with but little tension, is to a great extent freed from the water imbibed by it during immersion, and also that as the core upon which the line is wound allows air to come in contact with its inner coils, and the sides are equally exposed to evaporation, such line can be at once wound on the reel and allowed to dry there without any risk of becoming rotten thereby. In addition to this the arrangement of the transverse bars surrounding the spindle enables the line to be wound up almost as fast as by the use of a "multiplier," and with less trouble and risk of breakage.

It must be clearly understood that we do not confine ourselves to the exact construction of the several parts of the reel, as these may be varied to suit differing requirements, and any of the several novel features herein set forth may be used separately on reels of any ordinary construction—such as, for instance, a "click" or "stop" reel.

What we claim as our invention, and wish secured by Letters Patent, is as follows:

1. In a fishing-reel, the inner open revolving rings, both mounted on and connected by a central spindle, and also connected by a series of parallel bars, each placed equidistant from the central spindle, substantially as and for the purposes set forth.

2. The combination, with the stationary open rings, of the connecting and parallel guide-bars placed in pairs near the periphery of said wheels, substantially as shown, and for the purpose described.

3. The combination, in a fishing-reel, of stationary open rings with parallel guide-bars, a spindle, and inclosed revolving open rings with connecting parallel bars equidistant from spindle on which said rings are mounted, all substantially as shown, and for the purposes specified.

GEORGE HILLYARD MATTHEWS.
JOHN THOMAS OSTELL.

Witnesses:
FRAS. HY. REYNOLDS,
OWEN N. EVANS.